United States Patent
Chiu

(10) Patent No.: US 9,606,733 B2
(45) Date of Patent: Mar. 28, 2017

(54) DATA STORAGE DEVICE AND OPERATING METHOD

(71) Applicant: Silicon Motion, Inc., Jhubei (TW)

(72) Inventor: Shen-Ting Chiu, Houlong Township (TW)

(73) Assignee: Silicon Motion, Inc., Jhubei (TW)

( * ) Notice: Subject to any disclaimer, the term of this patent is extended or adjusted under 35 U.S.C. 154(b) by 87 days.

(21) Appl. No.: 14/537,551

(22) Filed: Nov. 10, 2014

(65) Prior Publication Data

US 2016/0132253 A1    May 12, 2016

(51) Int. Cl.
*G06F 12/00* (2006.01)
*G06F 3/06* (2006.01)
*G06F 12/02* (2006.01)

(52) U.S. Cl.
CPC ............ *G06F 3/0608* (2013.01); *G06F 3/064* (2013.01); *G06F 3/0652* (2013.01); *G06F 3/0679* (2013.01); *G06F 12/0246* (2013.01); *G06F 2212/1024* (2013.01); *G06F 2212/7205* (2013.01)

(58) Field of Classification Search
None
See application file for complete search history.

(56) References Cited

U.S. PATENT DOCUMENTS

| 2011/0055455 A1* | 3/2011 | Post | G06F 12/0246 711/103 |
| 2015/0161039 A1* | 6/2015 | Yeh | G06F 12/0246 711/103 |

OTHER PUBLICATIONS

"TN-2960: Garbage Collection in SLC NAND FLASH Memory" 2011, Micron Technology, Inc. retrieved from https://www.micron.com/~/media/documents/products/technical-note/nand-flash/tn2960_garbage_collection_slc_nand.pdf.*

* cited by examiner

*Primary Examiner* — Daniel Tsui
(74) *Attorney, Agent, or Firm* — Wang Law Firm, Inc.

(57) ABSTRACT

A data storage device includes a FLASH memory and a controller. The FLASH memory includes a plurality of blocks wherein each of the blocks includes a plurality of pages. The controller is coupled to the FLASH memory and utilized to execute a garbage-collection process on the FLASH memory according to a number of spare blocks in the FLASH memory and a number of inefficient blocks where most of the pages are spare in the FLASH memory. The garbage-collection process is utilized for merging at least two inefficient blocks to release at least one spare block from the inefficient blocks.

26 Claims, 5 Drawing Sheets

DATA STORAGE DEVICE AND OPERATING METHOD

BACKGROUND OF THE INVENTION

Field of the Invention

The present invention relates to a data storage device including a FLASH memory, and in particular it relates to executing the garbage-collection process on the FLASH memory.

Description of the Related Art

The garbage-collection (GC) process has been widely used on various kinds of memory devices. Specifically, the garbage-collection process is utilized to merge inefficient blocks where most of the pages are spare or empty into one efficient block for obtaining more spare blocks. Therefore, by regularly executing the garbage-collection process, the efficiency of the memory device could be improved.

However, whether the garbage-collection process is executed or not is usually determined by a single threshold value. When it is determined that the garbage-collection process is to be executed, the performance of the memory device suffers. For example, write latency suddenly increases and the performance abruptly decays due to the execution of the garbage-collection process. In addition, the memory device has different operation status and can be accessed with various commands from the host. Therefore, a dynamically adjusted garbage-collection process is needed to prevent the memory device of abrupt-decaying performance and also accord with various kinds of operation status and host commands.

BRIEF SUMMARY OF THE INVENTION

In an embodiment of the invention, a data storage device is provided. The data storage device includes a FLASH memory and a controller. The FLASH memory includes a plurality of blocks wherein each of the blocks comprises a plurality of pages. The controller is coupled to the FLASH memory and utilized to execute a garbage-collection process on the FLASH memory according to the number of spare blocks in the FLASH memory and the number of inefficient blocks where most of the pages are spare or empty in the FLASH memory. The garbage-collection process is utilized for merging at least two inefficient blocks to release at least one spare block from the inefficient blocks.

In the embodiment of the invention, the FLASH memory is in the first state when the number of inefficient blocks is less than a first threshold value; the FLASH memory is in the second state when the number of spare blocks in the FLASH memory is more than or equal to a second threshold value; the FLASH memory is in the third state or a fourth state when the number of spare blocks in the FLASH memory is more than or equal to a third threshold value but less than the second threshold value; the FLASH memory is in the fifth state when the number of spare blocks in the FLASH memory is more than or equal to a fourth threshold value but less than the third threshold value; and the FLASH memory is in the sixth state when the number of spare blocks in the FLASH memory is less than the fourth threshold value, wherein the second threshold value is greater than the third threshold value and the third threshold value is greater than the fourth threshold value.

In an embodiment of the invention, an operating method for a FLASH memory is provided. The operating method for a FLASH memory includes determining the number of spare blocks in the FLASH memory and an number of inefficient blocks where most of the pages are spare in the FLASH memory; and executing a garbage-collection process on the FLASH memory according to the number of spare blocks in the FLASH memory and the number of inefficient blocks. The garbage-collection process is utilized for merging at least two inefficient blocks to release at least one spare block from the inefficient blocks.

A detailed description is given in the following embodiments with reference to the accompanying drawings.

BRIEF DESCRIPTION OF THE DRAWINGS

For a more complete understanding of the illustrative embodiments and the advantages thereof, reference is now made to the following descriptions taken in conjunction with the accompanying drawing.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

The following description is of the best-contemplated operation of carrying out the invention. This description is made for the purpose of illustrating the general principles of the invention and should not be taken in a limiting sense. Certain terms and figures are used throughout the description and following claims to refer to particular components. As one skilled in the art will appreciate, manufacturers may refer to a component by different names. This document does not intend to distinguish between components that differ in name but not function. The terms "component", "system" and "device" used in the present invention could be the entity relating to the computer which is hardware, software, or a combination of hardware and software. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
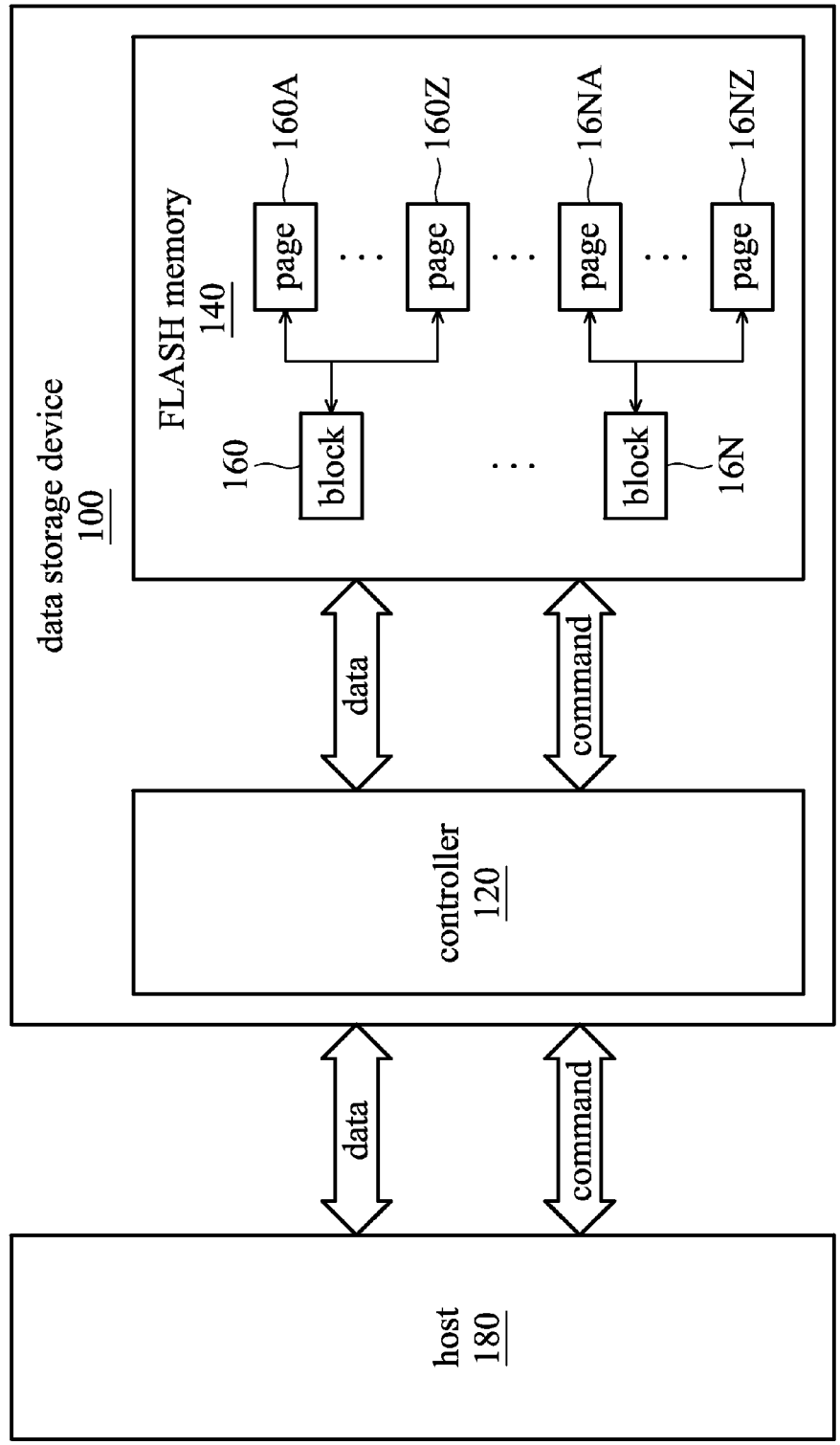
FIG. 1 is a block diagram of the data storage device according to one embodiment of the present invention.

FIG. 1 is a block diagram of the data storage device 100 according to one embodiment of the present invention. In one embodiment, the data storage device 100 includes the controller 120 and the FLASH memory 140, and the data storage device 100 is coupled to the host 180 for transmitting or receiving data and commands. As shown in FIG. 1, the FLASH memory 140 includes a plurality of blocks 160~16N, and each of the blocks 160~16N includes a plurality of pages 160A~16NZ. For example, the block 160 includes pages 160A~160Z, and the block 16N includes pages 16NA~16NZ. In addition, the controller 120 is coupled to the FLASH memory 140 to transmit or receive data and commands with each other. For further illustrations, the controller 120 may comprise a micro-controller and a read-only memory (ROM) stored with firmware codes. The micro-controller may execute the firmware codes to access or operate the FLASH memory 140. Specifically, the controller 120 reads or writes the pages 160A~16NZ of the FLASH memory 140 and further executes the garbage-collection process on the FLASH memory 140.

In one embodiment, the controller 120 is utilized to execute a garbage-collection process on the FLASH memory 140 according to numbers of spare blocks in the FLASH memory 140 and a number of inefficient blocks where most of the pages are spare in the FLASH memory. The garbage-collection process is utilized for merging at least two inefficient blocks and releasing at least one spare block from the inefficient blocks. For further illustrations, the spare block is characterized by each one of its pages being empty without any written data. The inefficient block is characterized by most of its pages being empty without any written data.

Figure 2:
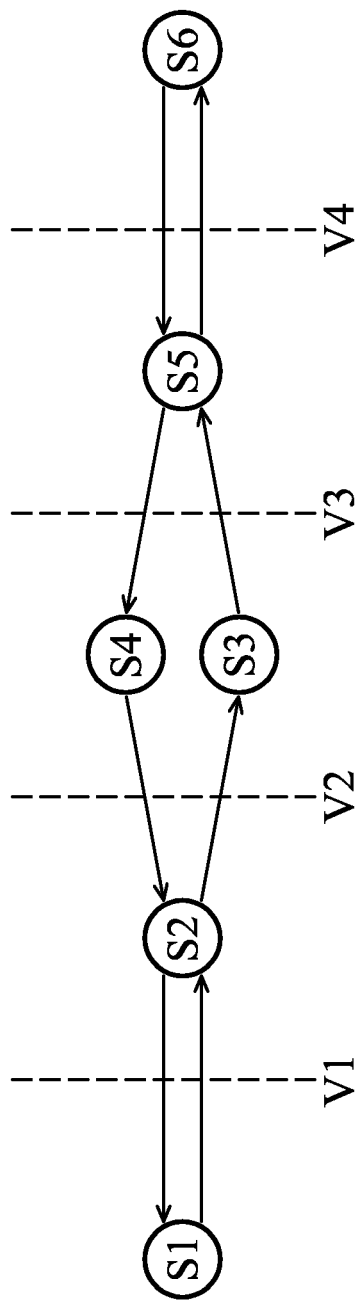
FIG. 2 is a schematic diagram showing a number of states of the FLASH memory according to one embodiment of the present invention.

In one embodiment, the garbage-collection process is executed or operated according to a number of threshold values rather than only one threshold value to avoid the abrupt latency of the Flash memory 140. For example, FIG. 2 is a schematic diagram showing a number of states of the FLASH memory 140 according to one embodiment of the present invention. In one embodiment, the FLASH memory 140 is in the first state S1 when the number of inefficient blocks is more than or equal to a first threshold value V1. The FLASH memory 140 is in the second state when the number of spare blocks in the FLASH memory is more than or equal to a second threshold value V2. The FLASH memory 140 is in the third state S3 or the fourth state S4 when the number of spare blocks in the FLASH memory 140 is more than or equal to a third threshold value V3 but less than the second threshold value V2. The FLASH memory is in the fifth state S5 when the number of spare blocks in the FLASH memory 140 is more than or equal to the fourth threshold value V4 but less than the third threshold value V3. The FLASH memory 140 is in the sixth state S6 when the number of spare blocks in the FLASH memory 140 is less than or equal to the fourth threshold value V4. It should be noted the second threshold value V2 is greater than the third threshold value V3, and the third threshold value V3 is greater than the fourth threshold value V4. For example, the FLASH memory has 1024 blocks, and the second threshold value V2, the third threshold value V3, and the fourth threshold value V4 are about 30, 24 and 18 respectively.

The detailed descriptions of the states of the FLASH memory 140 are illustrated in Table 1.

TABLE 1

| State | Description |
| --- | --- |
| S1 | The FLASH memory 140 has no inefficient blocks or very few inefficient blocks. |
| S2 | The FLASH memory 140 has many spare blocks and some inefficient blocks. |
| S3 | The FLASH memory 140 has enough spare blocks and needs good performance. |
| S4 | The FLASH memory 140 has enough spare blocks and could sacrifice some performance. |

TABLE 1-continued

| State | Description |
| --- | --- |
| S5 | The FLASH memory 140 does not have enough spare blocks. |
| S6 | The FLASH memory 140 has very few spare blocks. |

For example, when the FLASH memory 140 has no inefficient blocks or very few inefficient blocks, the number of the inefficient blocks would be less than the first threshold value V1 and the FLASH memory 140 is in the first state S1. The FLASH memory 140 also has enough spare blocks when it is in the first state S1. When the number of the inefficient blocks is greater than or equal to the first threshold value V1, the FLASH memory 140 is in the second state S2 and the garbage-collection process can be executed or initiated by the controller 120. For example, there are ten inefficient blocks in the FLASH memory 140. After executing the garbage-collection process, the ten inefficient blocks are collected and merged into one block to release the other nine spare blocks. In other words, an additional nine spare blocks are obtained.

In addition, the FLASH memory 140 is in the second state S2 and the garbage-collection process could be executed by the controller 120 when the number of the spare blocks of the FLASH memory 140 is greater than or equal to the second threshold value V2. More specifically, as more data written to the FLASH memory 140, the number of the spare blocks is reduced. Therefore, during the write operation, the state of the FLASH memory 140 changes from the second state S2 to the third state S3 if the number of the spare blocks is less than the second threshold value V2. Similarly, the FLASH memory 140 would enter the fifth state S5 or the sixth state S6 when the number of spare blocks is less than the third threshold value V3 or less than the fourth threshold value V4, respectively. When the FLASH memory 140 is in the sixth state S6, there are very few spare blocks and it is urgent to execute the garbage-collection process for obtaining more spare blocks so that the FLASH memory 140 could be accessed normally or properly. The state of the FLASH memory 140 would be changed from the sixth state S6 into the fifth state S5 or the fourth state S4 when the number of the spare blocks is more than or equal to the fourth threshold value V4 or the third threshold value V3, respectively.

It should be noted that the controller 120 executes more garbage-collection processes when the FLASH memory 140 is in the fourth state S4 than when the FLASH memory 140 is in the third state S3. The difference between the third state S3 and the fourth state S4 is that the good performance is put on a higher priority in the third state S3 than in the fourth state S4. On the other hand, the controller 120 executes more garbage-collection processes when the FLASH memory 140 is in the fourth state S4 since performance can be sacrificed in this state. However, the schematic diagram of FIG. 2 is for illustration and not for limitation. In other embodiments, the state of the FLASH memory 140 would be changed from the second state S2 to the fourth state S4 if the number of the spare blocks is less than the second threshold value V2. The state of the FLASH memory 140 would be changed from the fifth state S5 to the fourth state S4 if the number of the spare blocks is more than the third threshold value V3.

Figure 3:
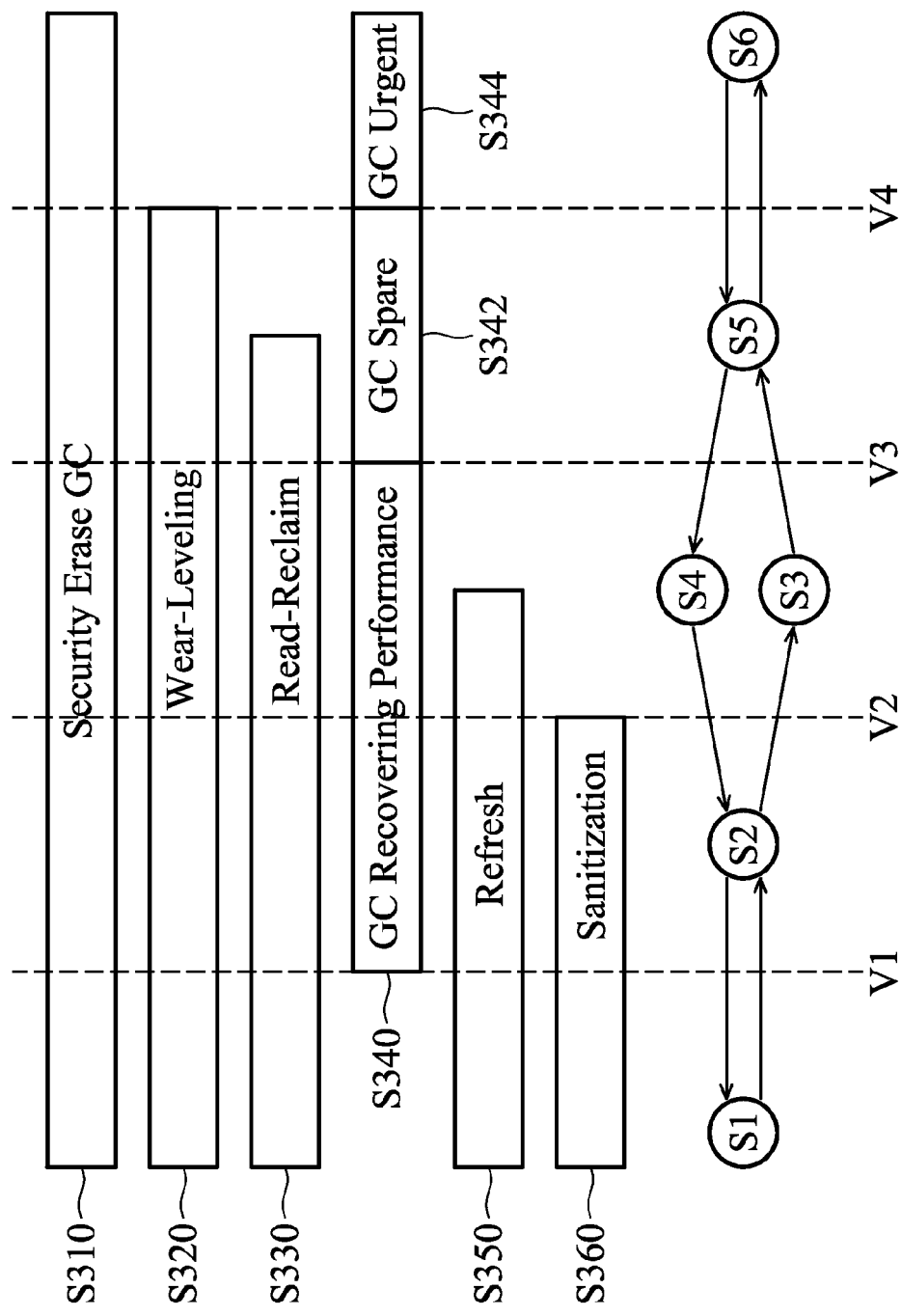
FIG. 3 is another schematic diagram showing a number of states of the FLASH memory with different operation modes and host commands according to one embodiment of the present invention.

FIG. 3 is another schematic diagram showing a number of states of the FLASH memory 140 with different operation modes and host commands according to one embodiment of the present invention. In one embodiment, the controller 120 further executes the garbage-collection process on the FLASH memory 140 according to the operation mode of the data storage device 100. More specifically, the operation mode of the data storage device includes the security erase GC operation S310, the wear-leveling operation S320 and the read-reclaim operation S330. In another embodiment, the operation mode of the data storage device 100 includes the wear-leveling operation S320 and the read-reclaim operation S330. It should be noted that the priority of executing the garbage-collection process with the wear-leveling operation S320 is higher than that with the read-reclaim operation S330.

As shown in FIG. 3, in one embodiment, the security erase GC operation S310 is executed when the FLASH memory 140 is in the first state S1, the second state S2, the third state S3, the fourth state S4, the fifth state S5 or the sixth state S6. Namely, the security erase GC operation S310 could be executed in each status of the FLASH memory 140. In another embodiment, the wear-leveling operation S320 is executed when the FLASH memory 140 is in the first state S1, the second state S2, the third state S3, the fourth state S4 or the fifth state S5. When the operation mode is the wear-leveling operation S320, the controller 120 assigns the blocks with lower erase counts as the blocks to be merged in the garbage-collection process. In other words, the blocks with lower erase counts are merged to release or obtain more spare blocks. In another embodiment, the read-reclaim operation S330 is executed when the FLASH memory 140 is in the first state S1, the second state S2, the third state S3, the fourth state S4 or the fifth state S5. When the operation mode is the read-reclaim operation S330, the controller 120 assigns the blocks to be reclaimed as the blocks to be merged for executing the garbage-collection process. In other words, the blocks which would be reclaimed are merged to release or obtain more spare blocks.

In addition, the GC recovering performance operation S340 is executed when the FLASH memory 140 is in the second state S2, the third state S3 or the fourth state S4, which means that the FLASH memory 140 has enough spare blocks and some GC could be executed or operated without affecting the performance too much. The GC spare operation S342 is executed when the FLASH memory 140 is in the fifth state S5, which means that the FLASH memory 140 does not have enough spare blocks and needs more spare blocks. The GC urgent operation S344 is executed when the FLASH memory 140 is in the sixth state S6, which means that the FLASH memory 140 has very few spare blocks and urgently needs more spare blocks.

Specifically, the frequency at which the garbage-collection process is executed when the FLASH memory 140 is in the sixth state S6 (corresponding to the GC recovering performance operation S340) is higher than that when the FLASH memory 140 is in the first state S1, the second state S2, the third state S3, the fourth state S4 (corresponding to the GC spare operation S342) or the fifth state S5 (corresponding to the GC urgent operation S344). To illustrate further, when the FLASH memory 140 is in the fourth state S4, the garbage-collection process is executed and data of the first size is written to the FLASH memory 140, after which the garbage-collection process is executed again. When the FLASH memory 140 is in the sixth state S6, the garbage-collection process is executed and data of the second size is written to the FLASH memory 140, after which the garbage-collection process is executed again. The second size is greater than the first size. For example, the first size is about 16K, and the second size is about 1 MB. In other words, the frequency of executing the garbage-collection process when the FLASH memory 140 is in the sixth state S6 is higher than that when the FLASH memory 140 is in the fourth state S4 since the sixth state S6 has a higher emergency of obtaining spare blocks than the other five states S1~S5. Therefore, a multiple garbage-collection process is provided with different frequencies of execution corresponding to different states S1~S6 of the FLASH memory 140.

In another embodiment, the controller 120 is coupled to the host 180, and the controller 120 further executes the garbage-collection process on the FLASH memory 140 according to the command transmitted by the host 180. Specifically, the command transmitted by the host 180 comprises a refresh command S350 or a sanitization command S360. For further illustrations, the garbage-collection process is executed according to the refresh command S350 when the FLASH memory 140 is in the first state S1, the second state S2, the third state S3 or the fourth state S4. The garbage-collection process is executed according to the sanitization command S360 when the FLASH memory 140 is in the first state S1 or the second state S2. Therefore, the present invention provides a dynamically-adjusted garbage-collection process and prevents the performance of the memory device from abruptly decaying, which is caused by a conventional garbage-collection process with a single threshold value. Furthermore, the garbage-collection process of the present invention could accord with or correspond to various kinds of operation statuses and host commands.

Figure 4A:
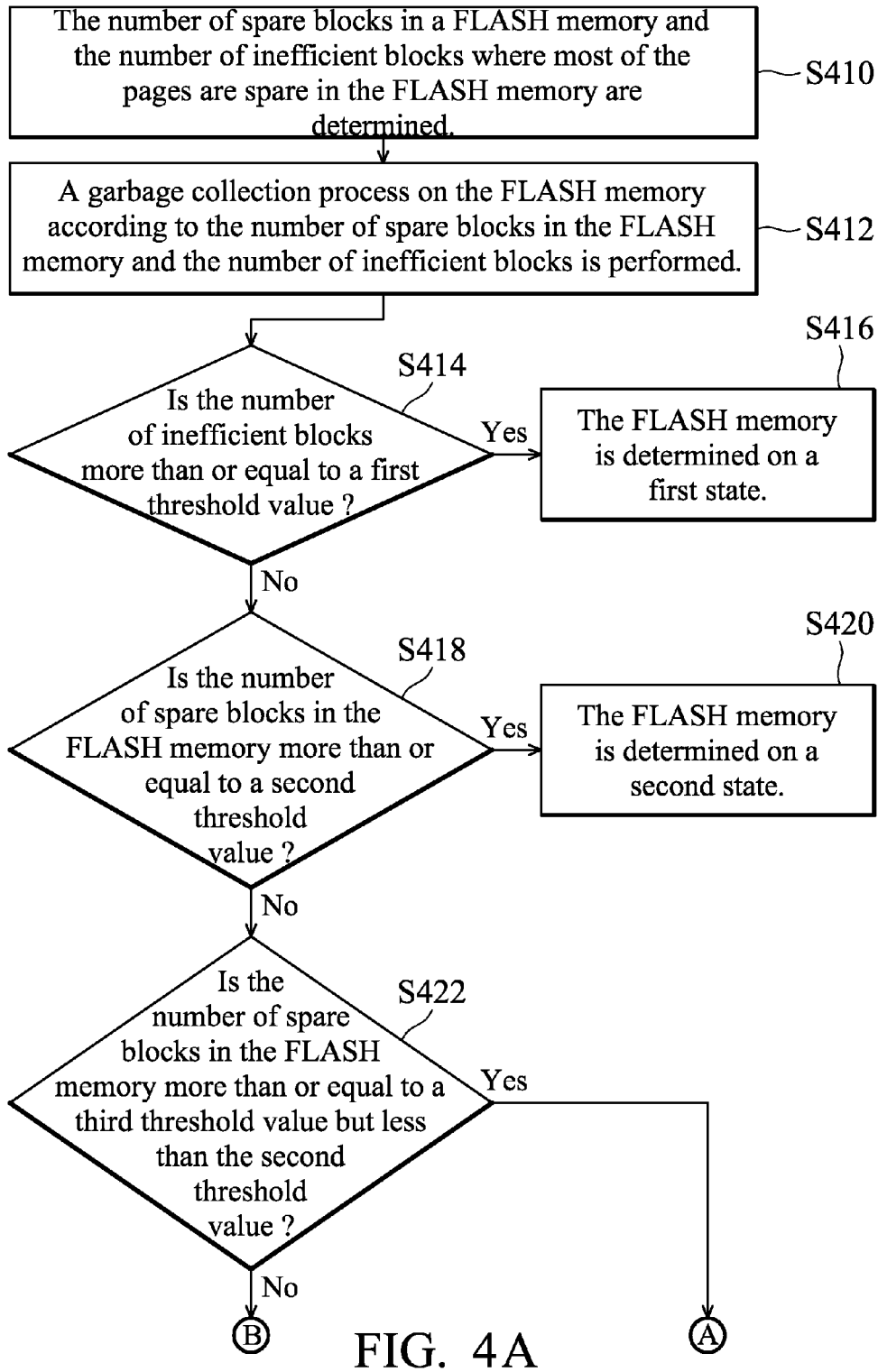
FIGS. 4A and 4B are flowcharts of an operating method for a FLASH memory according to one embodiment of the present invention.
Figure 4B:
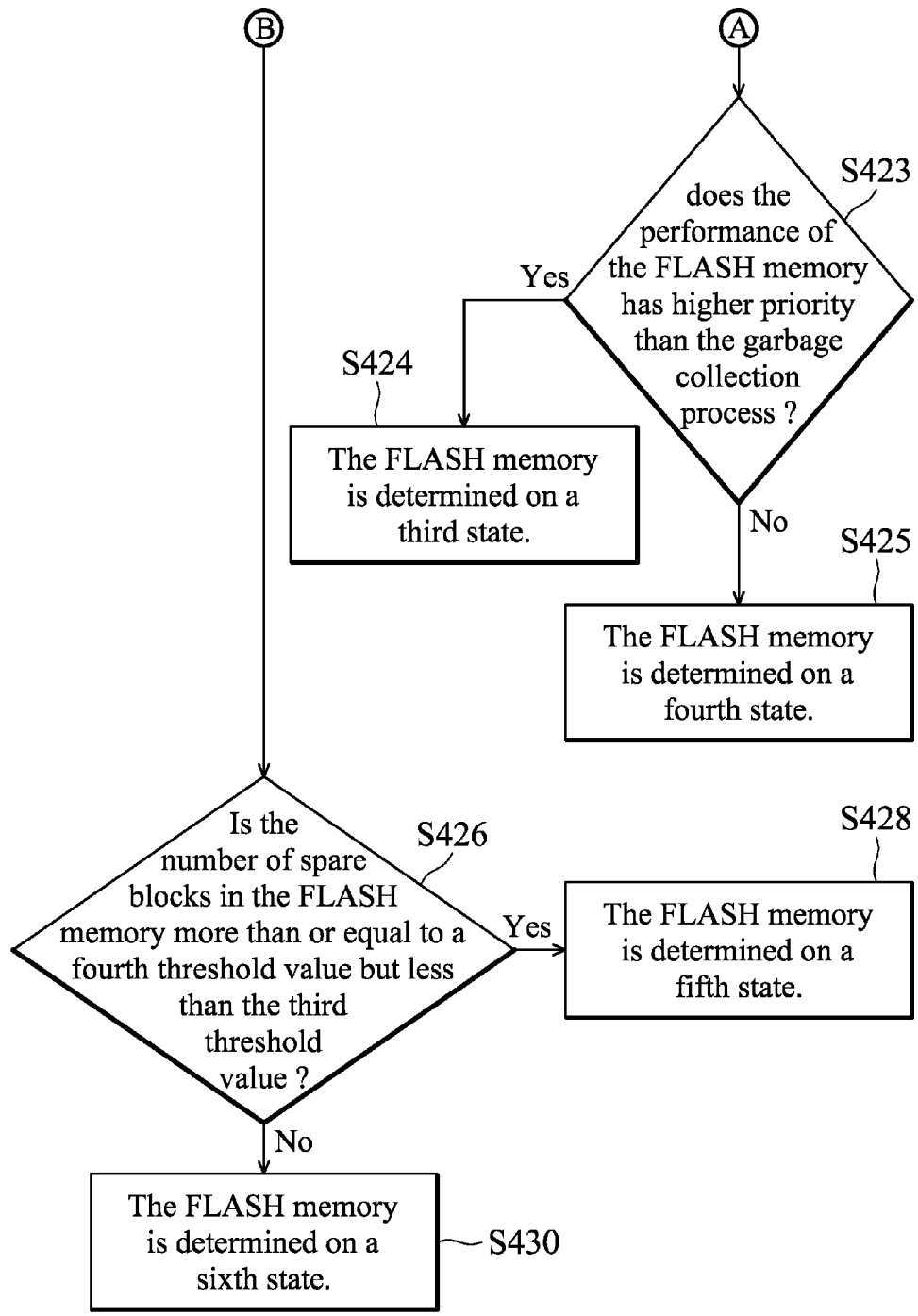

FIGS. 4A and 4B are flowcharts of an operating method for a FLASH memory 140 according to one embodiment of the present invention. In step S410, the number of spare blocks in a FLASH memory 140 and the number of inefficient blocks where most of the pages are spare in the FLASH memory 140 are determined. In step S412, a garbage-collection process is executed or performed on the FLASH memory 140 according to the number of spare blocks and the number of inefficient blocks in the FLASH memory 140. Afterwards, in step S414, whether the number of inefficient blocks is more than or equal to a first threshold value V1 is determined. If the number of inefficient blocks is more than or equal to a first threshold value V1, the flow goes to step S416 in which the FLASH memory 140 is determined to be operated in the first state S1. If the number of inefficient blocks is less than a first threshold value V1, the flow goes to step S418. In step S418, whether the number of spare blocks in the FLASH memory is more than or equal to the second threshold value V2 is determined. If the number of inefficient blocks is more than or equal to the second threshold value V2, the flow goes to step S420 in which the FLASH memory is determined to be operated in the second state S2. If the number of inefficient blocks is less than second threshold value V2, the flow goes to step S422.

In step S422, whether the number of spare blocks in the FLASH memory is more than or equal to the third threshold value V3 but less than the second threshold value V2 is determined. If the number of spare blocks in the FLASH memory is more than or equal to the third threshold value V3 but less than the second threshold value V2, the flow goes to step S423. If the number of spare blocks in the FLASH memory is less than the third threshold value V3, the flow goes to step S426. In step S423, whether the performance of the FLASH memory 140 has higher priority than the garbage-collection process or not is determined. If the performance of the FLASH memory 140 has higher priority than the garbage-collection process, step S424 is executed in which the FLASH memory 140 is determined to be operated in the third state S3. If the performance of the FLASH memory 140 does not have higher priority than the garbage-collection process, step S425 is executed in which the FLASH memory 140 is determined to be operated in the fourth state S4. Furthermore, in step S426, whether the number of spare blocks in the FLASH memory 140 is more than or equal to the fourth threshold value V4 but less than the third threshold value V3 is determined. If the number of spare blocks in the FLASH memory 140 is more than or equal to the fourth threshold value V4 but less than the third threshold value V3, step S428 is executed in which the FLASH memory 140 is determined to be operated in the fifth state S5. If the number of spare blocks in the FLASH memory 140 is less than the fourth threshold value V4, step S430 is executed in which the FLASH memory 140 is determined to be operated in the sixth state S6. Executing the garbage-collection process in various operation statuses and through various host commands has been illustrated before, and therefore they will not be described again here.

Although embodiments of the present disclosure and their advantages has been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that execute substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A data storage device, comprising:
a FLASH memory, comprising a plurality of blocks wherein each of the blocks comprises a plurality of pages; and
a controller, coupled to the FLASH memory and utilized to execute a garbage-collection process on the FLASH memory according to a number of spare blocks in the FLASH memory and a number of inefficient blocks where most of the pages are spare in the FLASH memory, wherein the garbage-collection process is utilized for merging at least two inefficient blocks to release at least one spare block from the inefficient blocks, and the garbage-collection process is executed according to a number of threshold values rather than only one threshold value, wherein the controller determines that:
the FLASH memory is in a first state when the number of inefficient blocks is less than a first threshold value;
the FLASH memory is in a second state when the number of spare blocks in the FLASH memory is more than or equal to a second threshold value; and
the FLASH memory is in a third state when the number of spare blocks in the FLASH memory is more than or equal to a third threshold value but less than the second threshold value.

2. The data storage device as claimed in claim 1, wherein the controller executes more garbage-collection processes when the FLASH memory is in the fourth state than when the FLASH memory is in the third state.

3. The data storage device as claimed in claim 1, wherein the controller further executes the garbage-collection process on the FLASH memory according to an operation mode of the data storage device.

4. The data storage device as claimed in claim 3, wherein the operation mode of the data storage device comprises a read-reclaim operation or a wear-leveling operation, and a priority of executing the garbage-collection process with the wear-leveling operation is higher than that with the read-reclaim operation.

5. The data storage device as claimed in claim 4, wherein the controller assigns the blocks to be reclaimed as the blocks to be merged when the operation mode is the read-reclaim operation, and the read-reclaim operation is executed when the FLASH memory is in the first state, the second state, the third state, the fourth state or the fifth state.

6. The data storage device as claimed in claim 4, wherein the controller assigns the blocks with lower erase counts as the blocks to be merged when the operation mode is the wear-leveling operation, and the wear-leveling operation is executed when the FLASH memory is in the first state, the second state, the third state, the fourth state or the fifth state.

7. The data storage device as claimed in claim 1, wherein the controller is coupled to a host, and the controller further executes the garbage-collection process on the FLASH memory according to a command transmitted by the host.

8. The data storage device as claimed in claim 7, wherein the command transmitted by the host comprises a refresh command or a sanitization command.

9. The data storage device as claimed in claim 8, wherein the garbage-collection process is executed according to the refresh command when the FLASH memory is in the first state, the second state, the third state or the fourth state, and the garbage-collection process is executed according to the sanitization command when the FLASH memory is in the first state or the second state.

10. The data storage device as claimed in claim 1, wherein the frequency of executing the garbage-collection process when the FLASH memory is in the sixth state is higher than that when the FLASH memory is in the first state, the second state, the third state, the fourth state or the fifth state.

11. The data storage device as claimed in claim 1, wherein the FLASH memory is in a fourth state when the number of spare blocks in the FLASH memory is more than or equal to a third threshold value but less than the second threshold value, and the second threshold value is greater than the third threshold value.

12. The data storage device as claimed in claim 1, wherein the FLASH memory is in a fifth state when the number of spare blocks in the FLASH memory is more than or equal to a fourth threshold value but less than the third threshold value, and the third threshold value is greater than the fourth threshold value.

13. The data storage device as claimed in claim 1, wherein the FLASH memory is in a sixth state when the number of spare blocks in the FLASH memory is less than the fourth threshold value.

14. An operating method for a FLASH memory, comprising:
- determining a number of spare blocks in the FLASH memory and a number of inefficient blocks where most of the pages are spare in the FLASH memory;
- executing a garbage-collection process on the FLASH memory according to the number of spare blocks in the FLASH memory and the number of inefficient blocks, wherein the garbage-collection process is utilized for merging at least two inefficient blocks to release at least one spare block from the inefficient blocks, and the garbage-collection process is executed according to a number of threshold values rather than only one threshold value, wherein the FLASH memory is determined in a first state when the number of inefficient blocks is less than a first threshold value, the FLASH memory is determined in a second state when the number of spare blocks in the FLASH memory is more than or equal to a second threshold value, the FLASH memory is determined in a third state when the number of spare blocks in the FLASH memory is more than or equal to a third threshold value but less than the second threshold value.

15. The operating method as claimed in claim 14, wherein the garbage-collection process is executed more when the FLASH memory is in the fourth state than when the FLASH memory is in the third state.

16. The operating method as claimed in claim 14, wherein the garbage-collection process is further executed on the FLASH memory according to an operation mode of the data storage device.

17. The operating method as claimed in claim 16, wherein the operation mode of the data storage device comprises a read-reclaim operation or a wear-leveling operation, and a priority of executing the garbage-collection process with the wear-leveling operation is higher than that with the read-reclaim operation.

18. The operating method as claimed in claim 17, wherein the blocks to be reclaimed are assigned as the blocks to be merged when the operation mode is the read-reclaim operation, and the read-reclaim operation is executed when the FLASH memory is in the first state, the second state, the third state, the fourth state or the fifth state.

19. The operating method as claimed in claim 17, wherein the blocks with lower erase counts are assigned as the blocks to be merged when the operation mode is the wear-leveling operation, and the wear-leveling operation is executed when the FLASH memory is in the first state, the second state, the third state, the fourth state or the fifth state.

20. The operating method as claimed in claim 14, wherein the garbage-collection process is further executed on the FLASH memory according to a command transmitted by a host.

21. The operating method as claimed in claim 20, wherein the command transmitted by the host comprises a refresh command or a sanitization command.

22. The data storage device as claimed in claim 21, wherein the garbage-collection process is executed according to the refresh command when the FLASH memory is in the first state, the second state, the third state or the fourth state, and the garbage-collection process is executed according to the sanitization command when the FLASH memory is in the first state or the second state.

23. The operating method as claimed in claim 14, wherein the frequency of executing the garbage-collection process when the FLASH memory is in the sixth state is higher than that when the FLASH memory is in the first state, the second state, the third state, the fourth state or the fifth state.

24. The operating method as claimed in claim 14, wherein the FLASH memory is determined in a fourth state when the number of spare blocks in the FLASH memory is more than or equal to a third threshold value but less than the second threshold value, and the second threshold value is greater than the third threshold value.

25. The operating method as claimed in claim 14, wherein the FLASH memory is determined in a fifth state when the number of spare blocks in the FLASH memory is more than or equal to a fourth threshold value but less than the third threshold value, and the third threshold value is greater than the fourth threshold value.

26. The operating method as claimed in claim 14, wherein the FLASH memory is determined in a sixth state when the number of spare blocks in the FLASH memory is less than the fourth threshold value.

* * * * *